United States Patent
Yoshida

(10) Patent No.: US 7,714,911 B2
(45) Date of Patent: May 11, 2010

(54) IMAGE PICKUP APPARATUS HAVING COMMUNICATION FUNCTION, METHOD FOR CONTROLLING THE SAME, AND COMPUTER-READABLE STORAGE MEDIUM

(75) Inventor: Masashi Yoshida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 372 days.

(21) Appl. No.: 11/756,379

(22) Filed: May 31, 2007

(65) Prior Publication Data

US 2007/0283031 A1    Dec. 6, 2007

(30) Foreign Application Priority Data

Jun. 2, 2006   (JP) .............................. 2006-154835

(51) Int. Cl.
H04N 5/76 (2006.01)
H04N 5/232 (2006.01)

(52) U.S. Cl. ................ 348/231.5; 348/211.2; 348/211.3

(58) Field of Classification Search .............. 348/211.2, 348/231.5, 211.3, 211.99, 231.3
See application file for complete search history.

(56) References Cited

U.S. PATENT DOCUMENTS

| | | | |
|---|---|---|---|
| 7,479,987 B2 * | 1/2009 | Watanabe et al. | 348/211.3 |
| 7,525,578 B1 * | 4/2009 | Barbeau | 348/211.2 |
| 7,573,503 B2 * | 8/2009 | Tanaka et al. | 348/211.2 |
| 2005/0134710 A1 * | 6/2005 | Nomura et al. | 348/240.99 |
| 2005/0162523 A1 * | 7/2005 | Darrell et al. | 348/211.2 |
| 2006/0025071 A1 * | 2/2006 | Yamazaki et al. | 455/3.06 |
| 2006/0152592 A1 * | 7/2006 | Chishima et al. | 348/211.3 |
| 2006/0250507 A1 * | 11/2006 | Miyajima et al. | 348/231.5 |
| 2008/0297608 A1 * | 12/2008 | Border et al. | 348/207.11 |

FOREIGN PATENT DOCUMENTS

JP    2005-223814 A    8/2005

* cited by examiner

Primary Examiner—Jason Whipkey
(74) Attorney, Agent, or Firm—Canon USA Inc IP Division

(57) ABSTRACT

An image pickup apparatus includes a capturing unit configured to capture a subject; a generating unit configured to generate a request packet to request information of an image stored in an external apparatus, wherein the request packet includes a parameter of the capturing; a request packet transmitting unit configured to transmit the request packet to the external apparatus, a response packet receiving unit configured to receive a response packet corresponding to the request packet, wherein the response packet includes the information of the image stored in the external apparatus; and an image acquiring unit configured to acquire the image from the external apparatus based on the information included in the response packet, wherein the generating unit generates the request packet in response to instructions to allow the capturing unit to perform capturing.

10 Claims, 13 Drawing Sheets

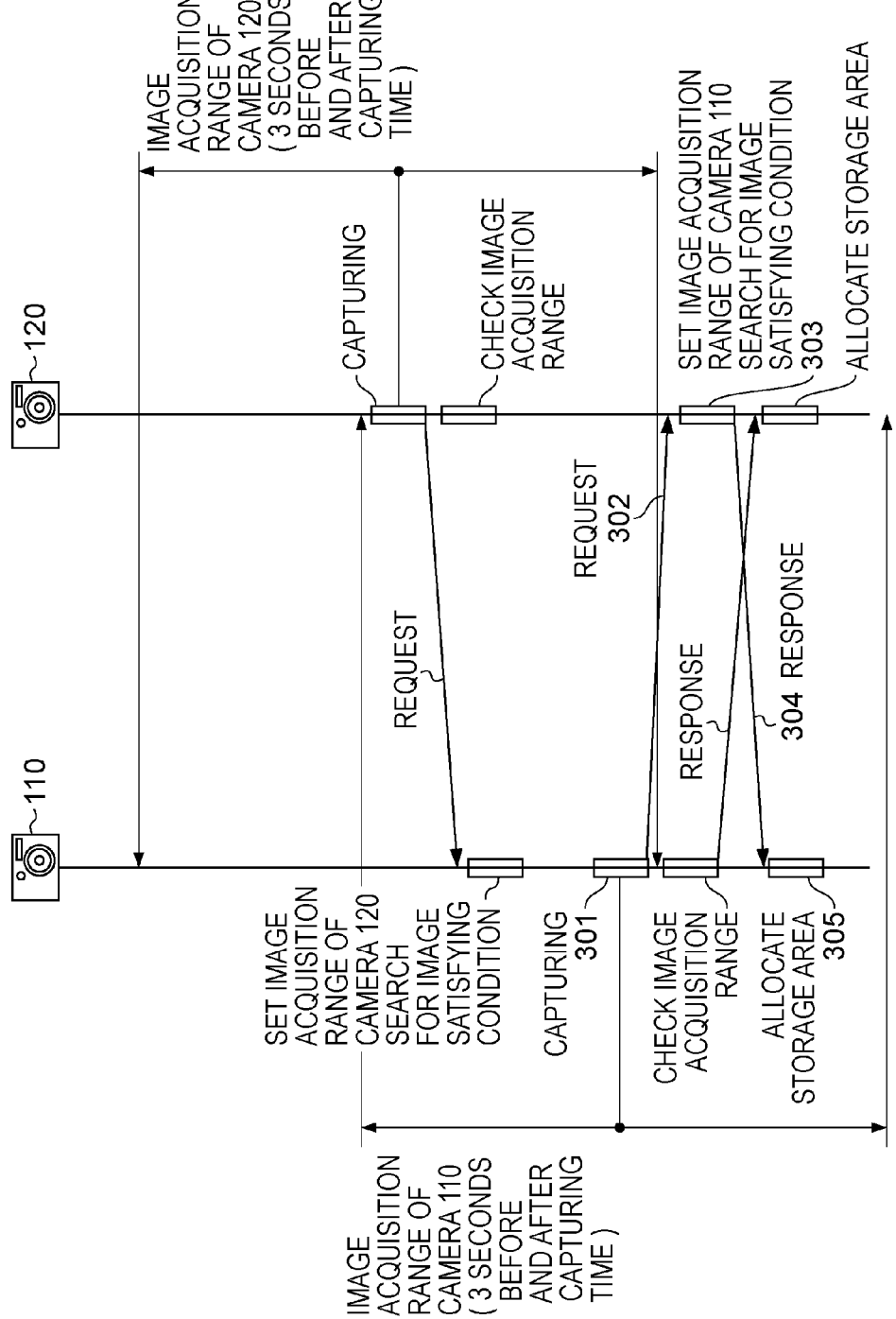

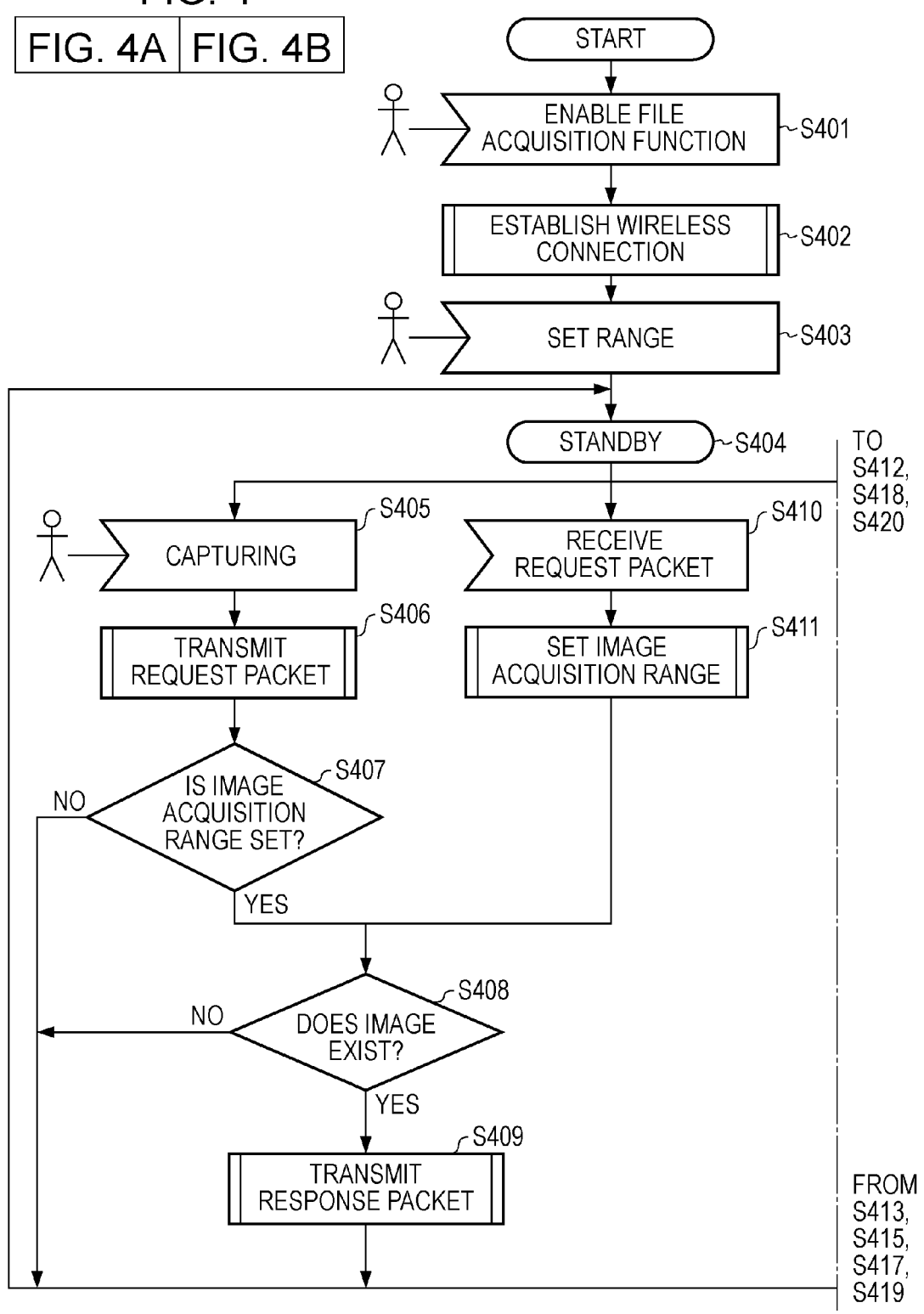

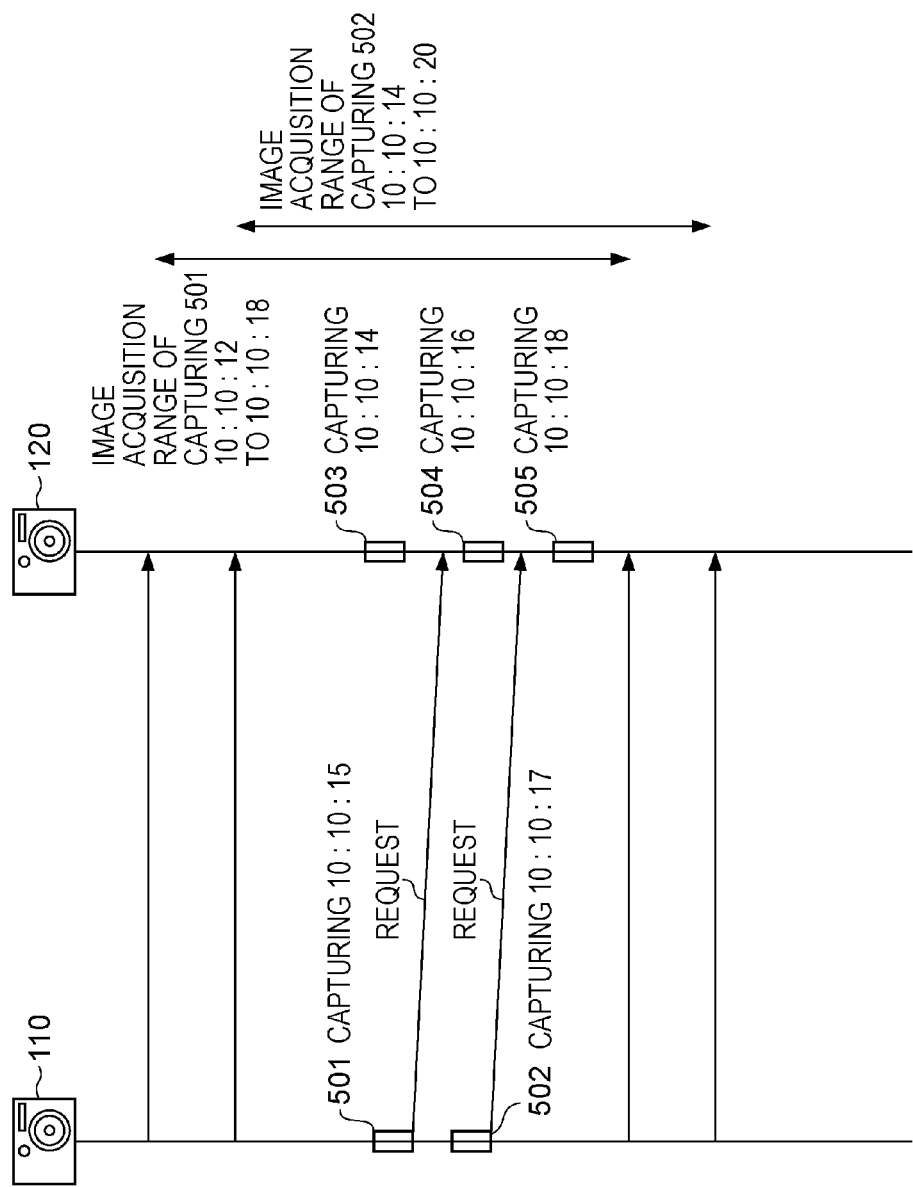

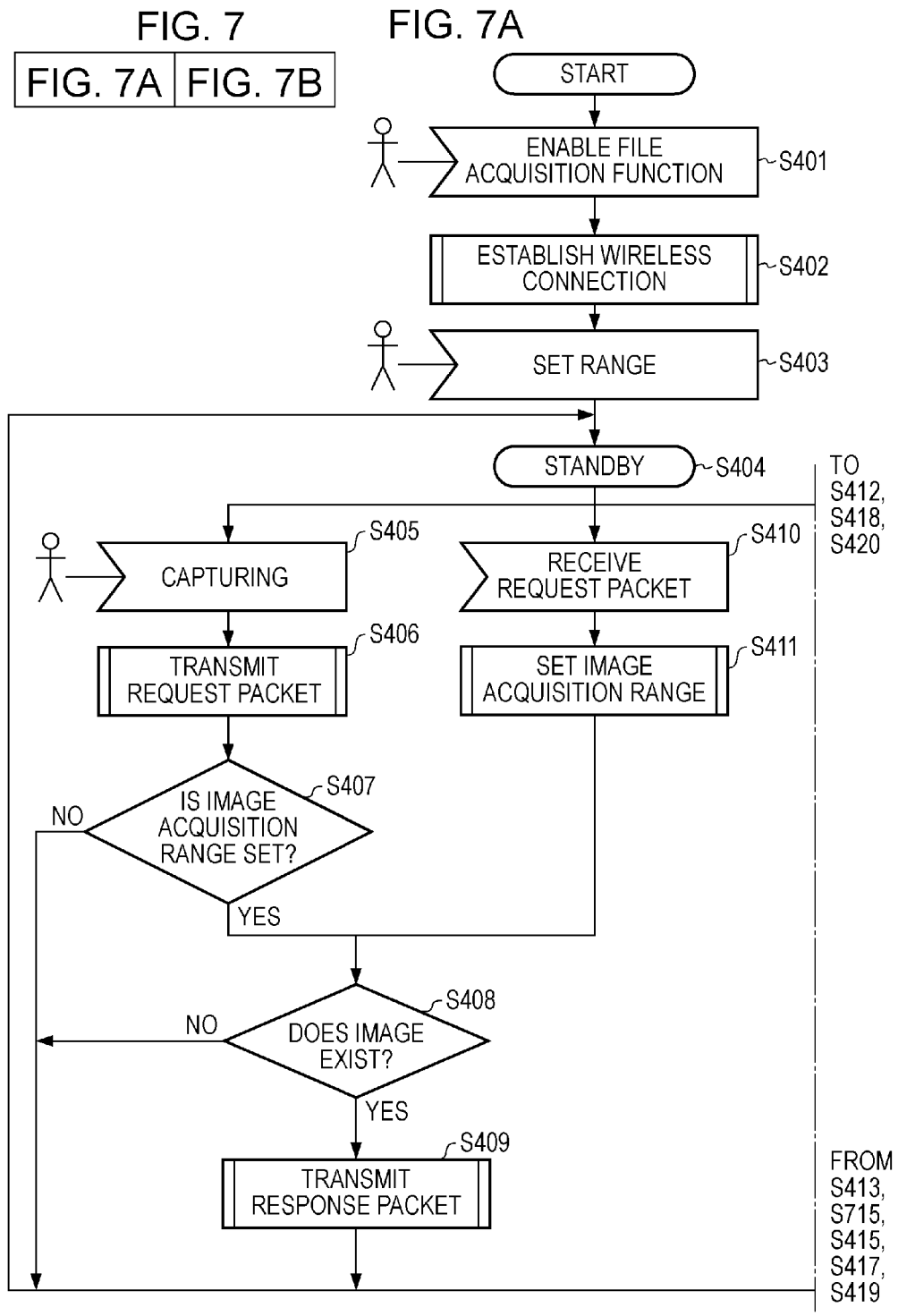

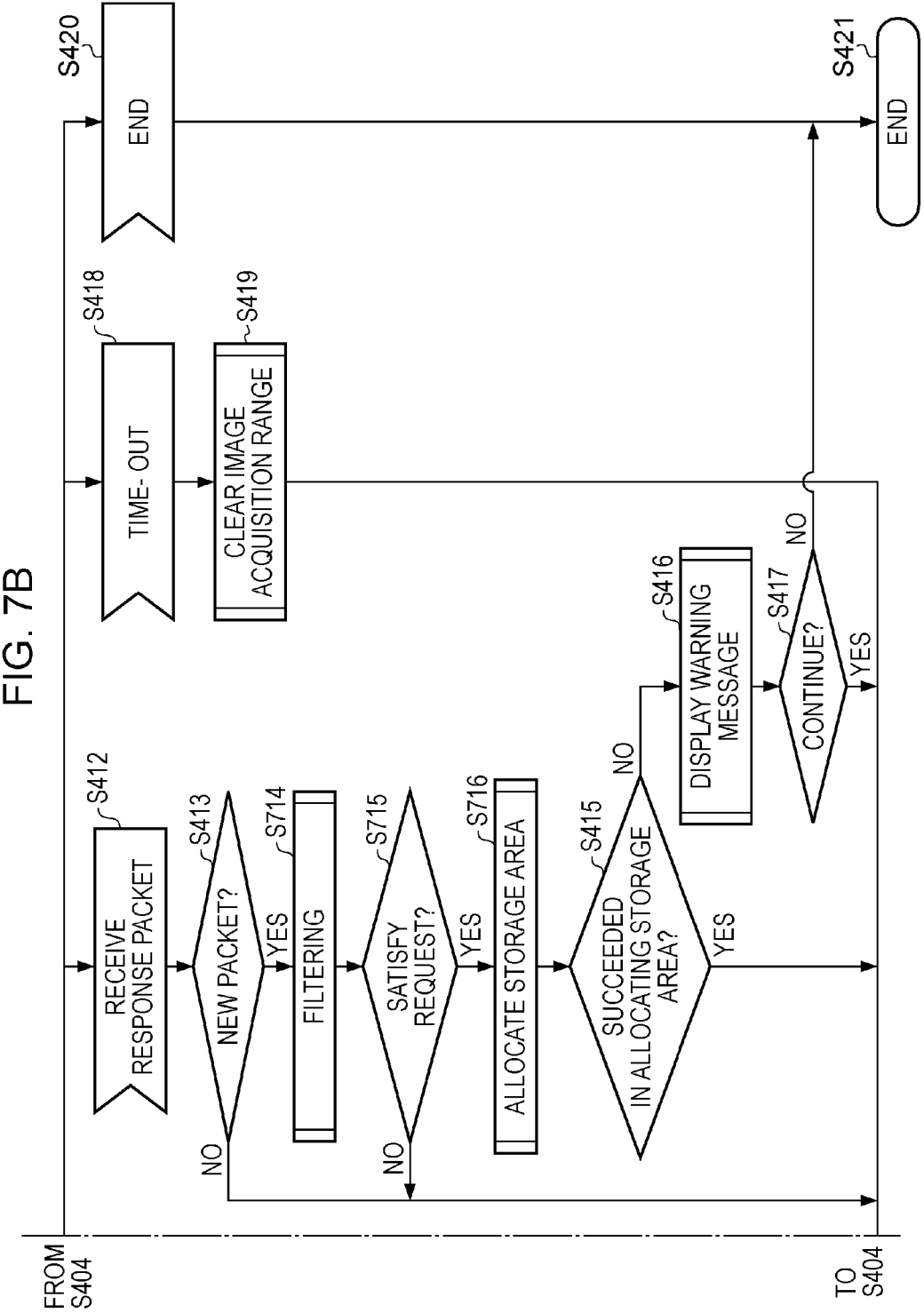

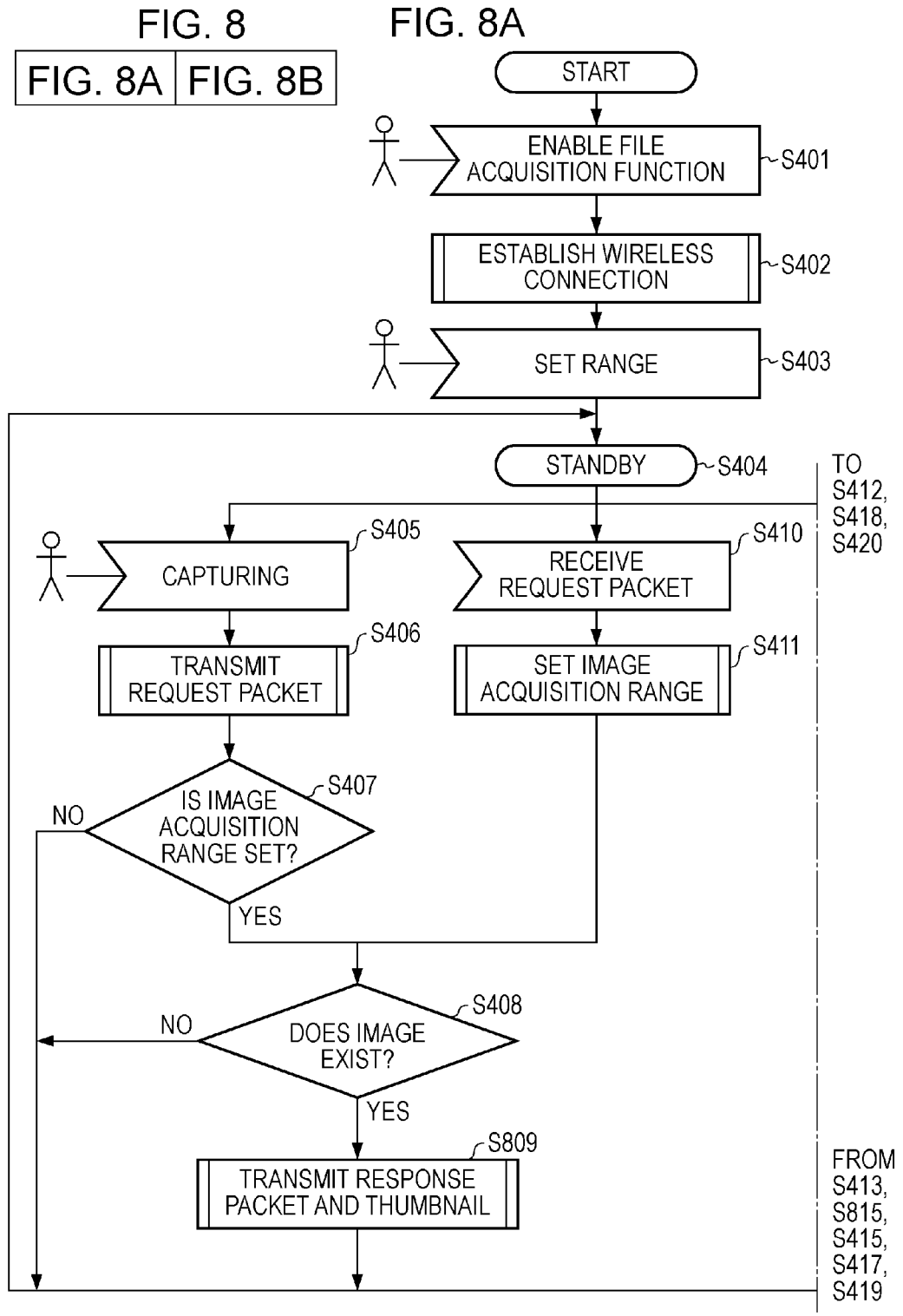

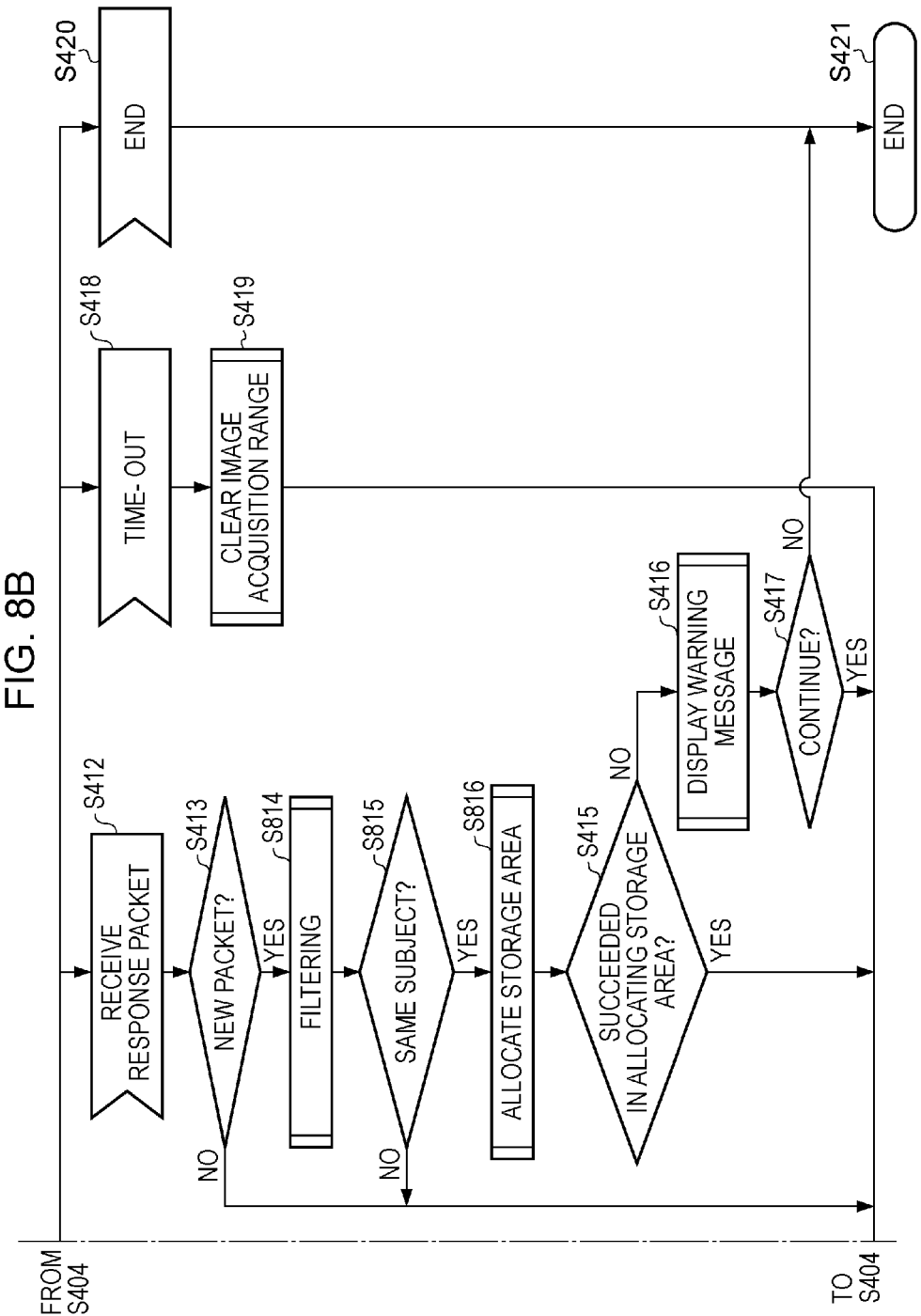

IMAGE PICKUP APPARATUS HAVING COMMUNICATION FUNCTION, METHOD FOR CONTROLLING THE SAME, AND COMPUTER-READABLE STORAGE MEDIUM

BACKGROUND OF THE INVENTION

1. Field of the Invention

The present invention relates to a technique for smoothly exchanging image files of users among a plurality of image pickup apparatuses.

2. Description of the Related Art

The widespread use of digital cameras in recent years has been amazing, and it has become popular to store information of picked up images as a digital data file in a recording medium in a camera, such as a memory card. The images picked up by such an apparatus can be easily transmitted/received in the form of an image data file by using a communication medium or a network medium.

For example, a service of uploading images to a server on the Internet so that members can browse and exchange the images (hereinafter referred to as "photo sharing service") has been widely used. By using this service, a user can easily receive an image captured by another user who participated in the same event or give an image captured by him/her to another user. In this way, images can be relatively easily exchanged among acquaintances or specific members.

On the other hand, owing to recent integration in devices for use in wireless communication, not only mobile personal computers (so-called notebook PCs) but also printers, mobile information apparatuses (PDA: personal digital assistance), digital cameras, and mobile phones are provided with a communication function using a wireless LAN. Accordingly, apparatuses that have conventionally had a function of communicating with a specific apparatus only via wired connection, such as a USB (universal serial bus) connection, can perform wireless data communication with various apparatuses.

The following method is an example of a method for acquiring an image file performed between image pickup apparatuses having a wireless communication function. That is, for example, Japanese Patent Laid-Open No. 2005-223814 discloses a method for performing wireless communication between one's camera and a nearby user's camera in a capturing site and automatically exchanging information for accessing each other's camera later, such as an e-mail address.

According to the method described in Japanese Patent Laid-Open No. 2005-223814, the user needs to start up an e-mail software in accordance with the access information or access a server providing the photo sharing service from his/her PC so as to select a desired image and to store the image in his/her PC, which is complicated.

When users who participated in the same event exchange images, they exchange images of that event. If the above-described technique is applied to this case, a receiver of images needs to select images of the event one by one from among images of various events so as to obtain the images, which is complicated. The user who captures images can group or narrow down the images in units of events in advance. In that case, however, the user needs to perform an operation for the grouping each time, which is complicated.

SUMMARY OF THE INVENTION

It is a feature of the present invention to solve the conventional problems.

According to an aspect of the present invention, an image pickup apparatus includes a capturing unit configured to capture a subject, a generating unit configured to generate a request packet to request information of an image stored in an external apparatus, wherein the request packet includes a parameter of the capturing, a request packet transmitting unit configured to transmit the request packet to the external apparatus, a response packet receiving unit configured to receive a response packet to the request packet from the external apparatus, wherein the response packet includes the information of the image stored in the external apparatus, and an image acquiring unit configured to acquire the image from the external apparatus on the basis of the content of the response packet, wherein the generating unit generates a request packet in response to instructions to allow the capturing unit to perform capturing.

According to another aspect of the present invention, a communication apparatus includes a storage unit configured to store an image; a request packet receiving unit configured to receive, from an image pickup apparatus, a request packet including an acquisition condition based on a parameter of capturing of a subject performed by the image pickup apparatus; a searching unit configured to search the storage unit for an image based on the acquisition condition included in the request packet; and a transmitting unit configured to transmit a response packet indicating that the image having a parameter of capturing satisfying the acquisition condition exists.

The present invention is directed to providing an image pickup apparatus capable of acquiring an image from an external apparatus with a simple operation.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

FIG. 3 illustrates a process sequence of the digital cameras according to the first exemplary embodiment of the present invention.

FIGS. 4A and 4B illustrate transition of states of the digital cameras according to the first exemplary embodiment of the present invention.

FIG. 5 illustrates a process sequence of the digital cameras according to the first exemplary embodiment of the present invention.

FIGS. 7A and 7B illustrate transition of states of the digital cameras according to the second exemplary embodiment of the present invention.

FIGS. 8A and 8B illustrate transition of states of the digital cameras according to the second exemplary embodiment of the present invention.

DESCRIPTION OF THE EMBODIMENTS

Figure 1:
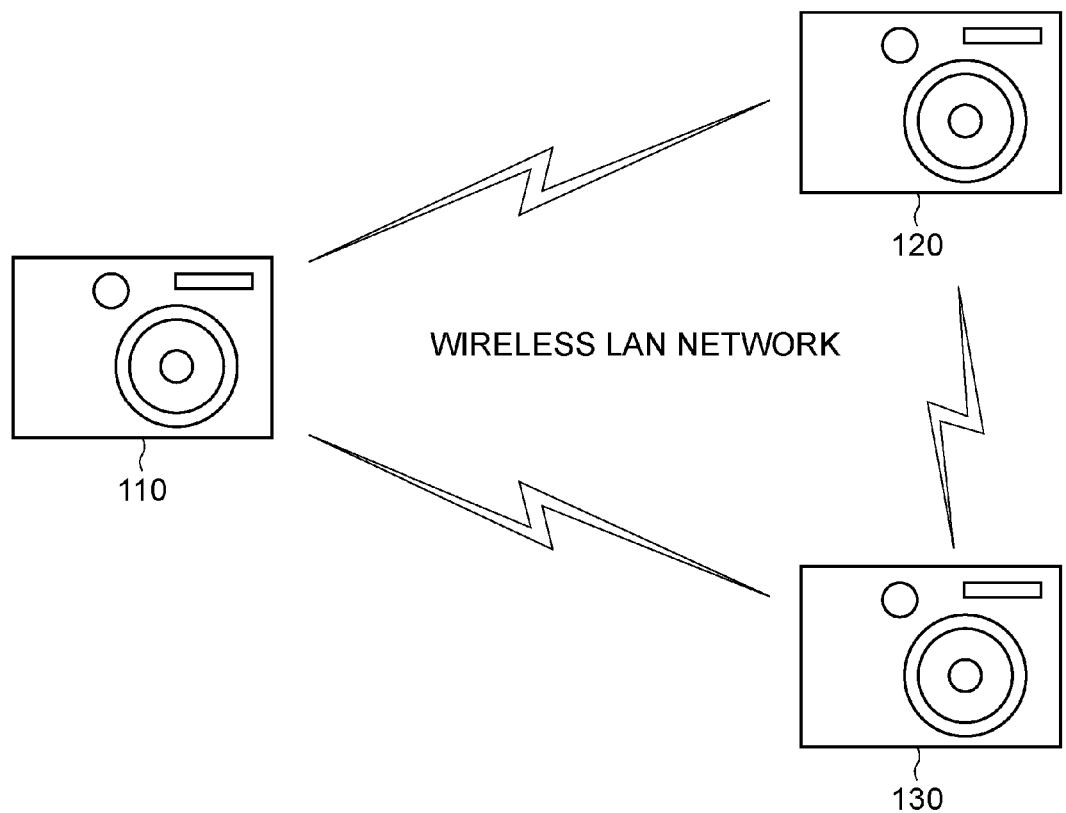
FIG. 1 illustrates a system configuration according to a first exemplary embodiment of the present invention.

FIG. 1 illustrates a configuration of a system according to a first exemplary embodiment of the present invention, in which digital cameras 110, 120, and 130 having a wireless communication function connect to each other via a wireless LAN (local area network) network.

Figure 2:
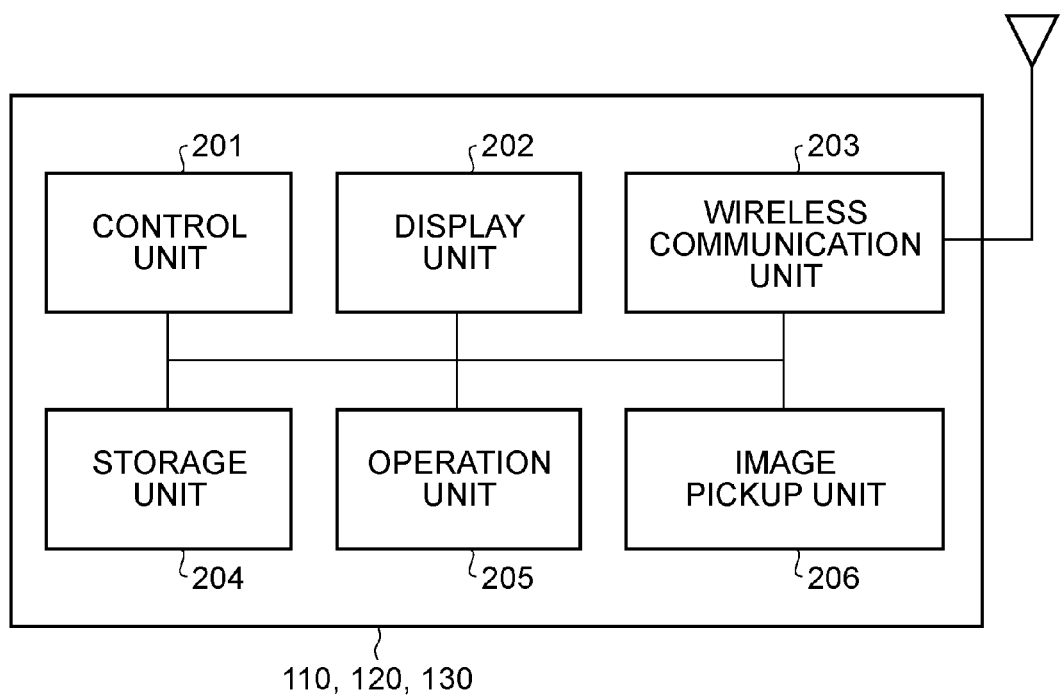
FIG. 2 illustrates a configuration of each of digital cameras according to a first and second exemplary embodiment of the present invention.

FIG. 2 illustrates a configuration of each of the digital cameras of the present embodiment. In the digital cameras 110, 120 and 130, a control unit 201 controls the entire apparatus in accordance with signals transmitted from each unit or various programs stored in a storage unit 204. A display unit 202 displays a menu and recorded images. A wireless communication unit 203 wirelessly communicates with an external apparatus. The storage unit 204 stores image files and various data, such as wireless parameters and setting values of an image acquisition range. An operation unit 205 includes operating members to perform various operations, such as switching or determination of various modes, setting of an image acquisition range, and an image pickup operation. An image pickup unit 206 includes a lens and an image pickup device.

Figure 4B:
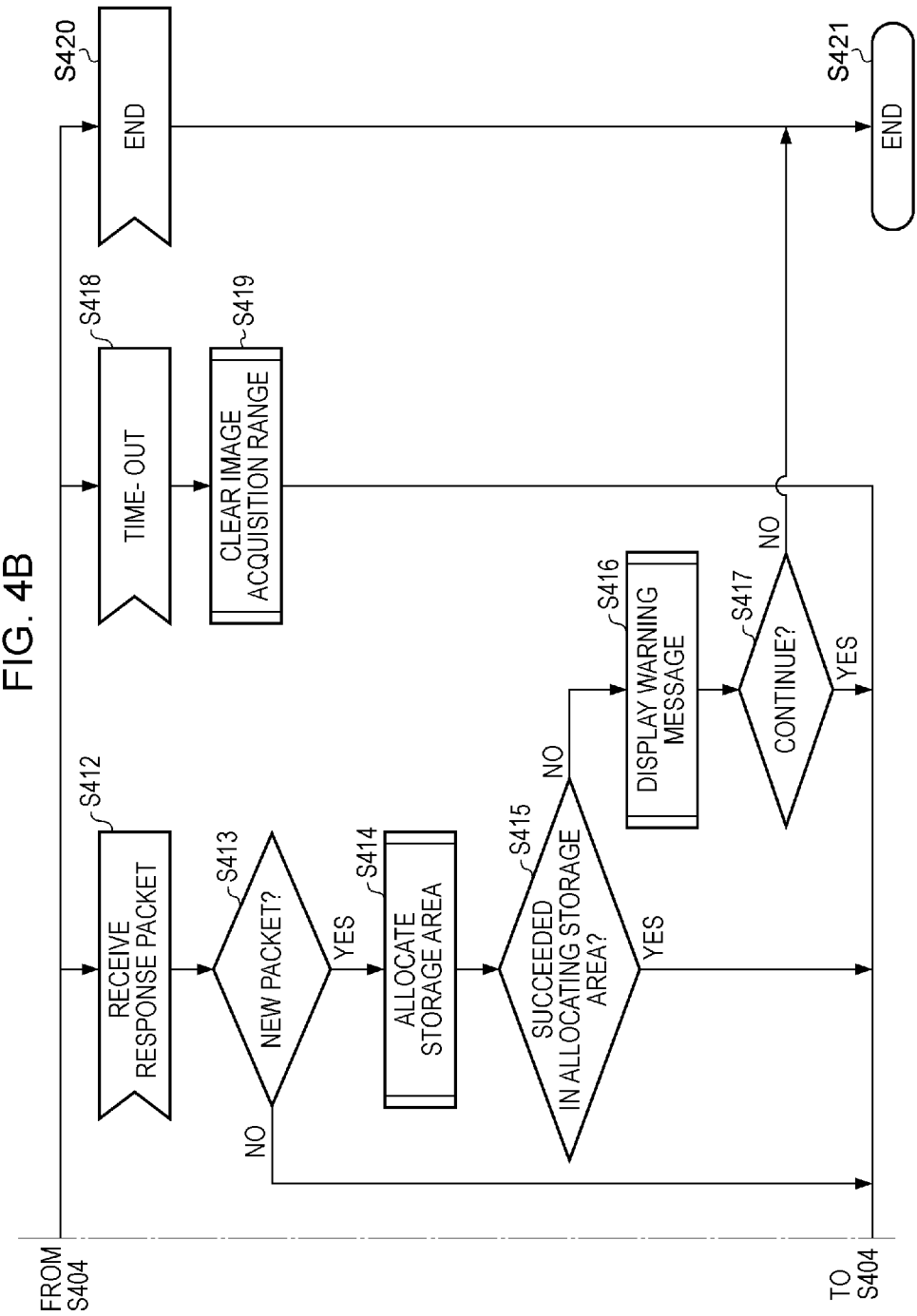
Figure 9:
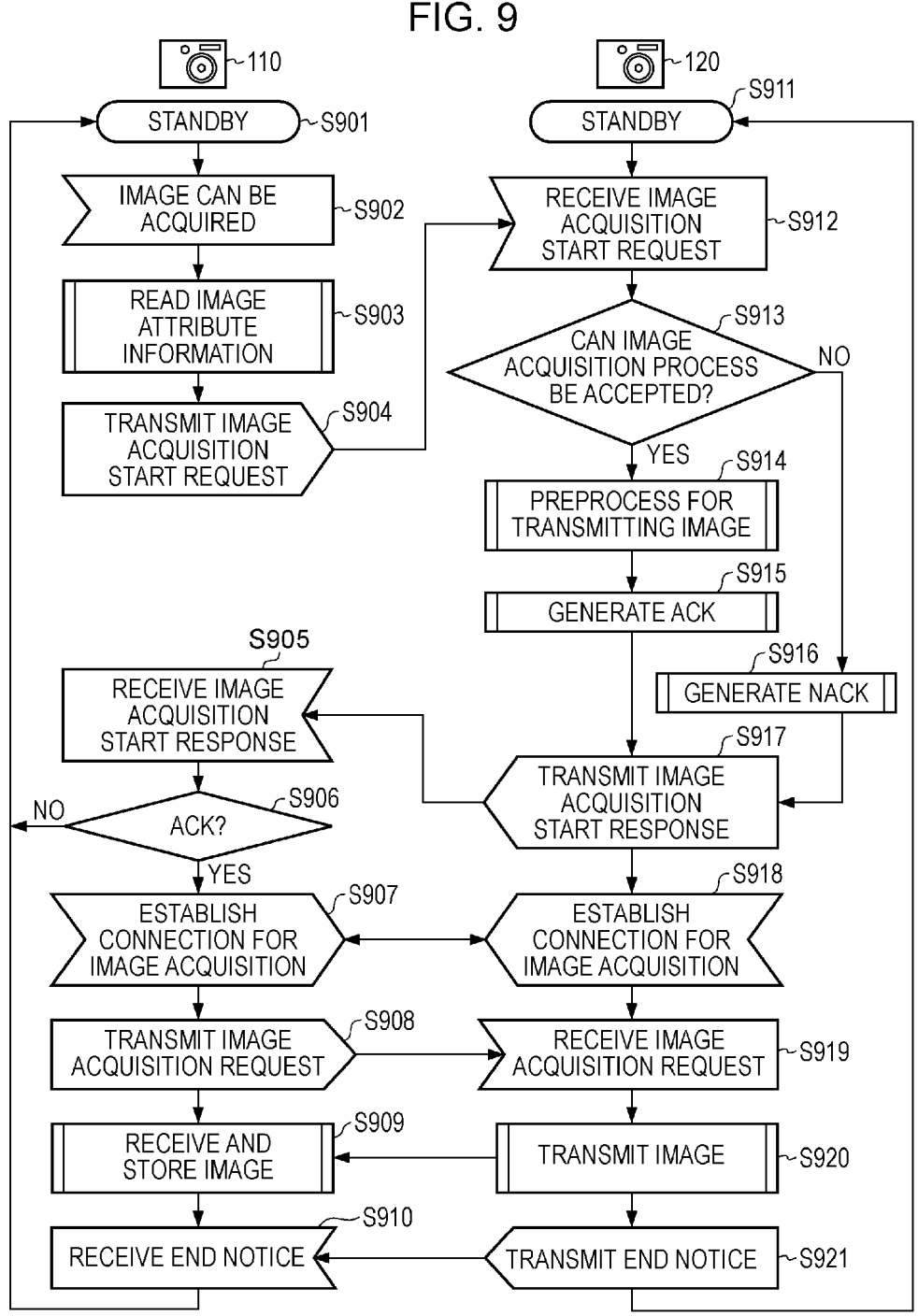
FIG. 9 illustrates transition of states of the digital cameras according to the first and second exemplary embodiments of the present invention.

FIGS. 3 and 5 illustrate process sequences according to the present embodiment, while FIGS. 4A, 4B, and 9 are flowcharts illustrating operations of the digital cameras 110, 120, and 130 according to the present embodiment. For descriptions purposes, digital camera 110 will be used to describe the features associated with digital cameras 110, 120, and 130.

Turning to FIG. 4A, a user operates the operation unit 205 of the digital camera 110 to provide instructions to enable a file acquisition function. In step S401, the digital camera 110 receives the instructions from the user and enables the file acquisition function.

After the file acquisition function is enabled, in step S402, the digital camera 110 establishes wireless connection with at least one other apparatus, i.e., the digital cameras 120 and 130. In the present embodiment, wireless parameters used for connecting to a wireless network are set in the digital cameras 110, 120, and 130 in advance, and the parameters are held in the storage unit 204 of each camera.

Figure 10:
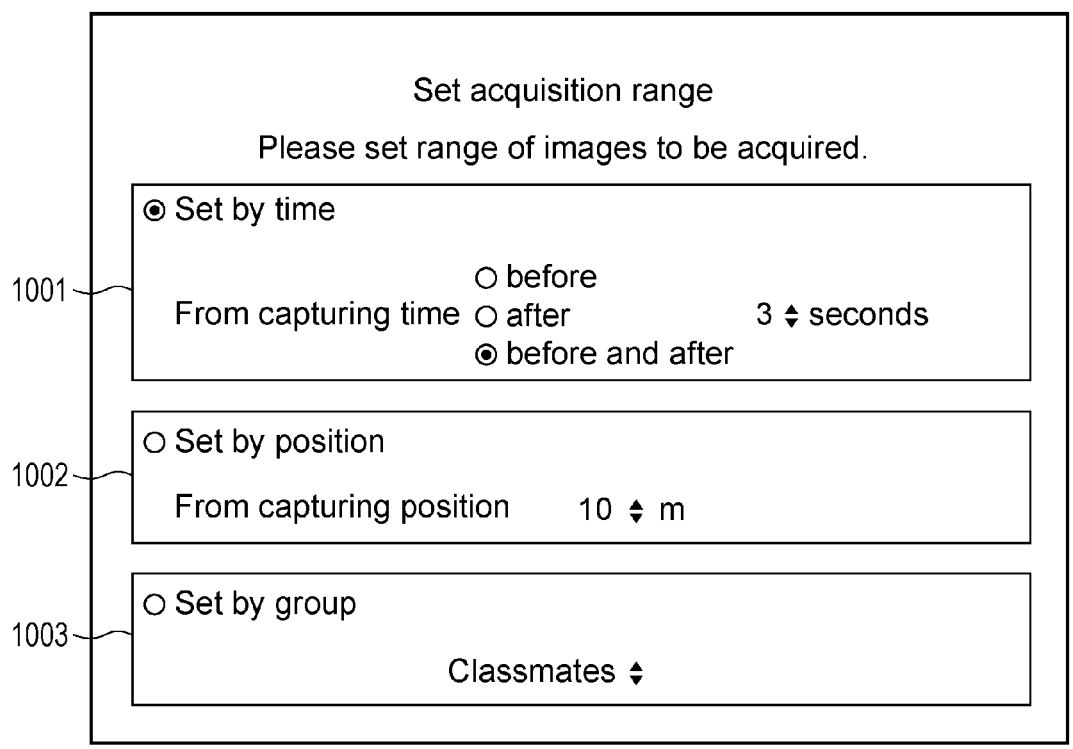
FIG. 10 illustrates an image acquisition range setting screen according to the first and second exemplary embodiments of the present invention.

Next, in step S403, the user operates the operation unit 205 of the digital camera 110 to set an image acquisition range on a menu screen. At this time, the digital camera 110 displays an image acquisition range setting screen in the display unit 202. The image acquisition range setting screen is illustrated in FIG. 10. The image acquisition range includes parameters indicating a range of an image acquisition condition used to acquire an image from another apparatus.

As illustrated in FIG. 10, the image acquisition range includes, but is not limited to, a time range of image acquisition 1001, a position range of image acquisition 1002, or a user group range of image acquisition 1003. The time range of image acquisition 1001 is a time range that is set when the user wants to acquire an image picked up in a specific time period. The position range of image acquisition 1002 is an area range that is set when the user wants to acquire an image picked up in a site within a specific range. The user group range of image acquisition 1003 is a range of group to which users or cameras belong, the user group range being set when the user wants to acquire an image picked up by a specific user.

In the present embodiment, the time range of image acquisition 1001 is set to three seconds before and after capturing. The digital camera 110 stores the input time range in the storage unit 204.

Please note that while the time range in the present embodiment is set to three seconds, any time range that would enable practice of the present invention can be set. In addition, the method for setting the time range of image acquisition is not limited to the setting on the image acquisition range setting screen illustrated in FIG. 10. For example, a time period from half-way pressing a shutter button to fully pressing the shutter button can be set as the image acquisition range.

After the image acquisition range has been set, the digital camera 110 is brought to a standby state in step S404. Following entry into the standby state, the digital camera 110 can perform a number of different processes.

First, a process performed in a case where the digital camera 110 performs capturing and exchanges images with the digital cameras 120 and 130 is described.

After instructions to perform capturing have been provided based on a user operation, the digital camera 110 performs capturing in step S405. This step corresponds to step 301 in FIG. 3.

After the capturing, the digital camera 110 reads the information of the image acquisition range stored in step S403 from the storage unit 204. Also, the digital camera 110 accesses the image picked up in step S405 and reads the capturing time thereof. Then, the digital camera 110 generates a request packet including the capturing time and the image acquisition range and transmits the request packet to the digital camera 120 and 130 in step S406. This step corresponds to step 302 in FIG. 3.

For example, when the time range of image acquisition is set to "three seconds before and after capturing", a packet requesting acquisition of an image picked up during three seconds before and after the capturing time of the image picked up in step S405 is transmitted. In this case, the digital camera 110 may calculate a specific time range based on the capturing time and the image acquisition range and include the specific time range in the request packet.

If the request packet is generated at the same time as the capturing, the packet may be generated by using the time at the capturing of a clock (not shown) in the digital camera 110, not the capturing time associated with the image. The request packet according to the present embodiment includes an IP address of the digital camera (120), a file ID of the image, and an image size. Also, the request packet includes information about the image acquisition range, such as capturing date and time, a capturing position, and a group.

Now, an operation performed when the digital cameras 120 and 130 in the standby state receive the request packet from the digital camera 110 is described. Herein, an operation performed by the digital camera 120 is described as an example.

First, in step S410, the digital camera 120 receives the request packet from the digital camera 110.

Next, in step S411, the digital camera 120 associates information included in the packet, such as the image acquisition range of the digital camera 110, with the IP address of the digital camera 110, which is also included in the request packet, and stores the information in the storage unit 204 of the digital camera 120.

Then, in step S408, the digital camera 120 searches the storage unit 204 and determines whether an image satisfying the condition of the image acquisition range stored in step S411 exists. This step corresponds to step 303 in FIG. 3. In the present embodiment, the image is searched for by reading the capturing time and the image acquisition range and calculating a specific condition of the capturing time.

If the image satisfying the condition exists, the process proceeds to step S409, where the digital camera 120 generates a response packet and transmits the response packet to the digital camera 110 by referring to the IP address included in the request packet. This step corresponds to step 304 in FIG. 3.

The digital camera 120 then returns to the standby state in step S404. If the image satisfying the condition does not exist, the digital camera 120 returns to the standby state in step S404. The response packet includes the IP address of the digital camera 120, the file ID of the image satisfying the condition written in the request packet, and the size of the image.

Next, an operation performed by the digital camera 110 that has received the response packet from the digital camera 120 is described.

Turning to FIG. 4B, the digital camera 110 receives the response packet in step S412.

Next, in step S413, the digital camera 110 determines whether the received response packet has the same content as that of an already received packet or is a newly received packet. The determination is made in the following way. That is, the content of already received packets is stored in the storage unit 204 and is compared with the content of a new packet. Alternatively, the file IDs or the sizes of images stored in the storage unit 204 may be compared with the file ID of the image file included in the response packet.

If the digital camera 110 determines that the response packet has the same content as that of an already received packet, the digital camera 110 returns to the standby state in step S404.

If the response packet is a newly received packet, the digital camera 110 stores the IP address of the digital camera 120, the file ID of the image, and the image size included in the response packet in the storage unit 204. Also, in step S414, the digital camera 110 allocates a storage area for the image size included in the response packet in the storage unit 204. This step corresponds to step 305 in FIG. 3.

Next, in step S415, the digital camera 110 determines whether it has succeeded in allocating the storage area. If succeeded, the digital camera 110 returns to the standby state in step S404. If the storage area is not available, the digital camera 110 displays a warning message in the display unit 202 in step S416, and then in step S417, prompts the user whether the process is to be continued.

In this way, according to the present embodiment, the digital camera 110 allocates a necessary storage area in advance. Accordingly, a situation that shortage of the storage area is found at the time of actually acquiring an image from the digital camera 120 can be prevented.

If instructions to continue the file acquisition function are provided via a user operation, the digital camera 110 returns to the standby state in step S404. If instructions to end the file acquisition function are provided, then in step S421, the digital camera 110 ends the file acquisition function.

Alternatively, the digital camera 110 may search for an image satisfying the condition of the image acquisition range requested by another camera at the capturing, and transmit the response packet. Accordingly, if a newly picked up image satisfies the condition of the image acquisition range, the response packet can be immediately transmitted. This process is described below.

After the capturing in step S405 and transmission of the request packet in step S406, in step S407, the digital camera 110 determines whether its storage unit 204 stores the image acquisition range of another digital camera. If the image acquisition range is not stored, the digital camera 110 returns to the standby state in step S404. If the image acquisition range is stored, flow proceeds to step S408, where the digital camera 110 searches the storage unit 204 and determines whether the image satisfying the condition of the image acquisition range exists therein.

If the image satisfying the condition of the image acquisition range exists, then in step S409, the digital camera 110 transmits a response packet on the basis of the IP address associated with the image acquisition range. If the image does not exist, the digital camera 110 returns to the standby state in step S404.

Turning to FIG. 4B, if the time set in the image acquisition range has passed in the standby state (step S418), then in step S419, the digital camera 110 clears the image acquisition range stored in the storage unit 204.

Returning to FIG. 4A, if next capturing is performed in another camera within the time set in the image acquisition range, that is, if another request packet is received (step S410), then in step S411, the image acquisition range is set again/updated.

A description will now be provided of the process illustrated in FIG. 5. Assume that capturing is performed in the digital camera 110 at 10:10:15 (ten o'clock, ten minutes, fifteen seconds) (501). Then, a request packet is transmitted and the image acquisition range of the digital camera 120 is set to three seconds before and after 10:10:15, that is, 10:10:12 to 10:10:18. Furthermore, if next capturing is performed in the digital camera 110 at 10:10:17 (502), the image acquisition range of the digital camera 120 is updated to 10:10:12 to 10:10:20. This is because three seconds before and after 10:10:17 corresponds to 10:10:14 to 10:10:20, and thus the end of the image acquisition range is updated to 10:10:20.

If instructions to end the process are provided from the user in the standby state, the digital camera 110 performs an ending operation in step S420 of FIG. 4B, and the process ends in step S421.

In this embodiment, the description has been made mainly about the digital camera 110. However, the above-described process is performed in the same manner also in the digital cameras 120 and 130.

This above-described process deals with transmitting/receiving a request packet and a response packet. At this stage, an image file is not yet transmitted/received, but the digital cameras notify each other which camera is requesting which image. That is, the image to be acquired is reserved among the plurality of digital cameras.

Now, a process of actually acquiring an image is described.

The process of actually acquiring an image from another digital camera (hereinafter referred to as "image acquiring process") can be performed at predetermined timing. For example, the image acquiring process can be automatically started if the digital camera 110 determines that data communication in the wireless communication unit 203 is not performed for a certain period of time or that pickup of an image by the image pickup unit 206 is not performed for a certain period of time. At these timings, a processing load of the digital camera 110 is relatively light, and thus the image acquiring process can be smoothly performed.

FIG. 9 illustrates the image acquiring process. First, in step S901, the digital camera 110 to acquire an image is in the standby state and in step S911, the digital camera 120 to provide the image is also in the standby state.

In step S902, a determination is made that an image can be acquired. Then, in step S903, the digital camera 110 reads attribute information, such as the IP address of the digital camera related to the image to be acquired and the file ID of the image, from the storage unit 204.

In step S904, the digital camera 110 transmits a request for starting the image acquiring process to the digital camera having the read IP address.

Turning to the digital camera 120, in step S912, the digital camera 120 receives the request transmitted from the digital camera 110. Then, in step S913, the digital camera 120 determines whether the image acquiring process can be accepted. If the process can be accepted, in step S914, the digital camera 120 performs a standby operation as a preprocess for transmitting an image and generates an ACK (acknowledgment) packet for the request for starting the process in step S915.

By transmitting the ACK packet, the digital camera 120, in step S917, transmits a response to the start request to the digital camera 110.

If determining in step S913 that the image acquiring process cannot be accepted, flow proceeds to step S916, where the digital camera 120 generates a NACK packet for the request. After transmitting the NACK packet, in step S917, the digital camera 120 transmits a response to the start request to the digital camera 110.

Turning back to the digital camera 110, in step S905, the digital camera 110 receives the response to the start request from the digital camera 120.

Then, in step S906, the digital camera 110 determines whether the received response is the ACK packet. If the response is not the ACK packet, that is, if the response is the NACK packet, the digital camera 110 returns to the standby state in step S901. If the response is the ACK packet, in step S907, the digital camera 110 establishes connection with the digital camera 120 in order to obtain the image, while the digital camera established connection with the digital camera 110 in step S918.

After the connection has been established, in step S908, the digital camera 110 transmits an image acquisition request including the file ID read in step S903 to the digital camera 120.

In step S919, the digital camera 120 receives the image acquisition request.

In step S920, the digital camera 120 reads the image corresponding to the file ID included in the received image acquisition request from the storage unit 204 and transmits the image to the digital camera 110.

After transmitting the image, the digital camera 120 in step S921 transmits an end notice to the digital camera 110 and returns to the standby state in step S911.

In step S909, the digital camera 110 receives the image data from the digital camera 120 and stores it in the storage unit 204.

After receiving the end notice from the digital camera 120 in step S910, the digital camera 110 returns to the standby state in step S901.

In the present embodiment, the time range of image acquisition is set as the image acquisition range. However, the present invention is not limited to this. For example, as described above, the position range of image acquisition can be set by using a position information system, such as a GPS (global positioning system), to acquire an image picked up by a digital camera. Alternatively, the user group of image acquisition can be divided in accordance with the relationship between the user and the members in the group and the group range may be set. That is, a range of members exchanging images may be set in units of user groups. The groups can be set by grouping of the IP addresses of the digital cameras or IDs unique to the digital cameras.

When the time range of image acquisition is set as the image acquisition range, it is more effective if the time of clocks in the digital cameras 110, 120, and 130 is set right automatically or manually at the time when the cameras are wirelessly connected. The automatic setting of time can be realized by mutual notification of values of the clocks (not shown) in the digital cameras through wireless communication.

In the present embodiment, the image acquisition range is provided as a condition of an image to be acquired. By providing the range of requesting acquisition of an image, an image picked up with another angle at almost the same time as capturing performed by a user can be acquired. With this process, an image that a user is interested in can be easily acquired.

Also, in the present embodiment, at capturing, a request packet and a response packet are transmitted and an image is not transmitted. Accordingly, an increase in load of communication during capturing can be prevented. If a sufficient communication speed can be ensured, the image instead of the request/response packet may be transmitted/received.

Furthermore, in the present embodiment, image acquisition is performed by using the IP address of a camera, and thus images can be easily exchanged between cameras without the need for specialized electronic mail software or connecting to a server providing the photo sharing service from a PC.

Since the image acquiring process is automatically performed at the timing of light load of the digital camera, the user need not provide instructions to perform the image acquiring process. Of course, the user can start the image acquiring process at a desired timing by operating the operation unit 205. In this case, it is desirable to perform the entire process with only one operation. For example, an image acquisition button is provided in the operation unit 205 and the user provides instructions to start the image acquiring process by pressing the image acquisition button. With this process, the user need not perform an operation of connecting with another apparatus, specifying a desired image, and transmitting/receiving the image.

The operation of transmitting a request packet and a response packet can be switched by setting corresponding modes. In this case, a mode switching button is provided in the operation unit 205 so that the above-described transmission/reception of packets is performed in a first mode and that transmission/reception of packets is not performed in a second mode. That is, the button to switch between ON and OFF according to the present embodiment enables the user to arbitrarily determine whether the file acquisition function is to be performed by the digital camera.

The apparatus to receive the request packet is not limited to the digital camera, but may be any communication apparatus, such as an image viewer. Additionally, the request packet and the response packet may be relayed by a relay apparatus, such as a server.

Figure 6:
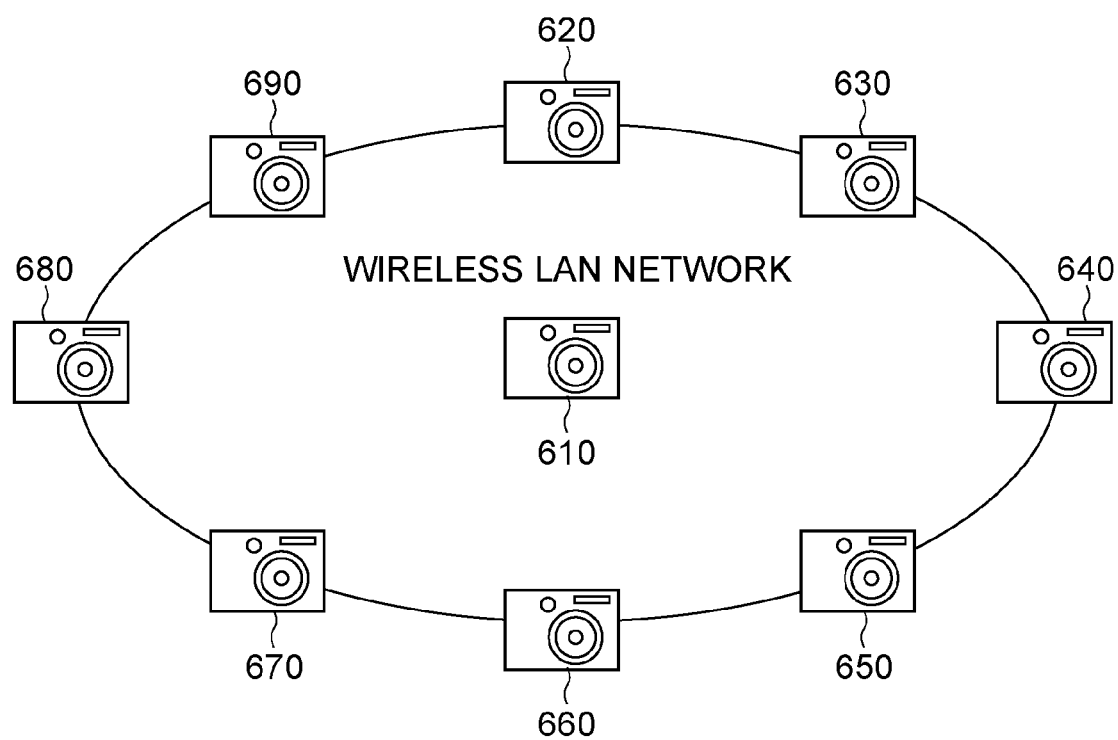
FIG. 6 illustrates a system configuration according to the first exemplary embodiment of the present invention.

FIG. 6 illustrates a system configuration according to a second exemplary embodiment, in which digital cameras 610 to 690 having a wireless communication function connect to each other via a wireless LAN network. The configuration of each of the digital cameras realizing the present embodiment is the same as that in the first exemplary embodiment. As such, a description of the configuration is omitted herein.

FIGS. 7A, 7B, 8A and 8B illustrate transition of states of the digital cameras 610 to 690 according to this embodiment.

When the first embodiment is applied in a case where many digital cameras connect to each other via a wireless LAN network as illustrated in FIG. 6 or where a wide image acquisition range is set, many response packets will be transmitted to a request packet that is transmitted at capturing. At this time, if a memory area is allocated to all of the response packets, an available area in a recording medium runs out and the apparatus cannot perform capturing.

The digital camera according to the present embodiment filters many response packets upon receipt of the response packets and allocates a memory area only to a specific response packet. Also, by appropriately setting a condition of filtering, shortage of the area in the recording medium can be prevented and only an image satisfying a user's requirement can be acquired.

Hereinafter, operations of the digital cameras according to the present embodiment are described. The present embodiment has many features common to those of the first embodiment. A detailed description of these common features will be omitted herein.

Turning to FIG. 7B, in step S412, the digital camera 610 receives response packets from other digital cameras. Next, in step S413, the digital camera 610 determines whether the received response packets are new packets.

If the response packets are new packets, the digital camera 610 performs filtering in step S714. More specifically, the digital camera 610 reads the capturing date/time included in each of the response packets and compares them with the image acquisition range in the request packet transmitted in step S406.

Then, in step S716, the digital camera 610 selects a predetermined number of (e.g., three) of response packets that are nearest to the condition indicated by the image acquisition range, and allocates a storage area for the images corresponding to the selected response packets. For example, when the time range of image acquisition is set as the image acquisition range of the request packet, a storage area for the three response packets, including a time approximate to the capturing time included in the request packet, is allocated.

When the position range of image acquisition is set, a storage area for the three response packets, including a capturing site near the capturing site included in the request packet, is allocated. With this filtering, the storage area to be allocated in the storage unit is that for three image files at the maximum, so that shortage of the area in the storage medium can be prevented. Furthermore, by selecting three images for which the storage area is to be allocated in the order of approximation to the condition of image acquisition, only images that are more approximate to the requested condition can be obtained.

FIGS. 8A and 8B illustrate another filtering process of the present embodiment. Turning to FIG. 8A, in step S809, the digital camera 620 transmits thumbnail image(s) along with the response packet.

Turning to FIG. 8B, when the digital camera determines in step S413 that a new response packet was received, flow proceeds to step S814, where the digital camera 610 identifies the thumbnail associated with the response packet by image recognition and compares the thumbnail with the image picked up by the digital camera 610.

As a result of comparison, if the thumbnail and the picked up image have the same subject (YES in step S815), then in step S816, the digital camera 610 allocates a storage area.

With the above-described processes, an image that the user wants, that is, only an image picked up by another camera, of which subject is captured by the user can be obtained. Furthermore, since a storage area is not allocated to an image of another subject, shortage of the area in the recording medium can be prevented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-154835 filed Jun. 2, 2006, which is hereby incorporated by reference herein in its entirety.

What is claimed is:

1. An image pickup apparatus comprising:
a capturing unit configured to capture a subject;
a generating unit configured to generate a request packet to request information of an image stored in an external apparatus, in response to instructions to allow the capturing unit to perform capturing,
wherein the request packet includes a parameter of the performed capturing, and the parameter of the performed capturing is time when the image is captured by the capturing unit;
a request packet transmitting unit configured to transmit the request packet to the external apparatus;
a response packet receiving unit configured to receive a response packet corresponding to the request packet,
wherein the response packet includes the information of the image stored in the external apparatus; and
an image acquiring unit configured to acquire the image from the external apparatus based on the information included in the response packet.

2. The image pickup apparatus according to claim 1, wherein the response packet includes an address of the external apparatus and identification information specifying the image that can be acquired.

3. The image pickup apparatus according to claim 2, further comprising:
a storage unit configured to store the response packet; and
an instructing unit configured to provide instructions to start acquisition of the image,
wherein the image acquiring unit reads the stored response packet in response to the instructions to start acquisition of the image, communicates with the external apparatus based on the address of the external apparatus included in the read response packet, and acquires the image based on the identification information.

4. The image pickup apparatus according to claim 1, further comprising:
an acquisition condition setting unit configured to set an acquisition condition to acquire an image from the external apparatus,
wherein the request packet is generated by the generating unit based on the parameter of the capture and the acquisition condition set by the acquisition condition setting unit, and
wherein the response packet includes information of an image satisfying the acquisition condition included in the request packet.

5. The image pickup apparatus according to claim 4, wherein the acquisition condition is a condition indicating a certain range having a reference which is the parameter of the capture.

6. The image pickup apparatus according to claim 5, wherein the acquisition condition setting unit sets a time period from pressing a first switch on the image pickup apparatus to pressing a second switch on the image pickup apparatus as the range.

7. The image pickup apparatus according to claim 5, wherein the parameter of the capture is a position where the image is captured by the capturing unit.

8. The image pickup apparatus according to claim 1, further comprising:

an allocating unit configured to allocate a storage area to store the image to be acquired from the external apparatus based on the content of the response packet received by the response packet receiving unit.

9. The image pickup apparatus according to claim 1, further comprising:

an image recognizing unit configured to recognize the image received together with the response packet, and an allocating unit configured to allocate a storage area to store the image to be acquired from the external apparatus based on a recognition result of the image recognizing unit.

10. A method for controlling an image pickup apparatus, the method comprising:

capturing a subject;

generating a request packet to request information of an image stored in an external apparatus, in response to instructions to perform capturing, wherein the request packet includes a parameter of the performed capturing, and the parameter of the performed capturing is time when the image is captured;

transmitting the request packet to the external apparatus;

receiving a response packet corresponding to the request packet, wherein the response packet includes the information of the image stored in the external apparatus; and acquiring the image from the external apparatus based on the content of the response packet.

* * * * *